United States Patent [19]

Clausen

[11] Patent Number: 5,823,332

[45] Date of Patent: Oct. 20, 1998

[54] MULTIMEDIA STORAGE DEVICE

[75] Inventor: Eivind Clausen, Bellingham, Wash.

[73] Assignee: Allsop, Inc., Bellingham, Wash.

[21] Appl. No.: 745,794

[22] Filed: Nov. 8, 1996

Related U.S. Application Data

[60] Provisional application No. 60/006,586 Nov. 13, 1995.

[51] Int. Cl.⁶ ................................................ B65D 85/57
[52] U.S. Cl. .................................. 206/307.1; 206/308.1; 206/308.3; 211/41.12
[58] Field of Search ............................. 206/307.1, 308.1, 206/308.3, 387.14, 387.15; 211/40, 41.12; 312/9.58, 9.64

[56] References Cited

U.S. PATENT DOCUMENTS

| | | | |
|---|---|---|---|
| 3,897,871 | 8/1975 | Zinnbauer | 211/40 |
| 4,003,468 | 1/1977 | Berkman | 206/307.1 |
| 4,411,481 | 10/1983 | Berkman | 206/387.14 |
| 4,498,583 | 2/1985 | Long et al. | 206/308.3 |
| 4,775,049 | 10/1988 | Kirchner et al. | 206/387.15 |
| 4,776,482 | 10/1988 | Wolters et al. | 206/308.3 |
| 4,781,423 | 11/1988 | Muenzer et al. | 206/308.3 |
| 4,782,949 | 11/1988 | Berkman | 206/387.14 |
| 4,819,813 | 4/1989 | Schubert . | |
| 4,850,477 | 7/1989 | Gelardi et al. | 206/387.15 |
| 4,875,743 | 10/1989 | Gelardi et al. | 206/308.1 |
| 5,201,414 | 4/1993 | Kaszubinski | 206/308.1 |
| 5,335,795 | 8/1994 | Chizen | 211/40 |
| 5,464,091 | 11/1995 | Callahan et al. | 206/308.3 |
| 5,586,650 | 12/1996 | Yeh | 206/308.1 |
| 5,597,216 | 1/1997 | Real et al. | 206/307.1 |

*Primary Examiner*—Jimmy G. Foster
*Attorney, Agent, or Firm*—Christensen O'Connor Johnson & Kindness, PLLC

[57] ABSTRACT

A device for storing substantially planar media comprises a base having sidewalls and a containing area located between the sidewalls, and a tile having a plurality of holders for storing the substantially planar media and having an outer shape designed so as to be received within the containing area of the base and further designed, in conjunction with the containing area of the base, such that the tile may be arranged within the containing area of the base in first and second orientations with the first orientation preferably being substantially orthogonal to the second orientation.

48 Claims, 8 Drawing Sheets

MULTIMEDIA STORAGE DEVICE

This application relates to U.S. Provisional application Ser. No. 60/006,586, filed Nov. 13, 1995, to which benefit under 35 USC 119(e) is claimed.

FIELD OF THE INVENTION

The present invention relates generally to storage devices, and more particularly, to devices for holding media that store information in formats suitable for use by electronic devices.

BACKGROUND OF THE INVENTION

The sizes and types of media that store information in formats suitable for use by electronic devices has increased dramatically in recent years. For example, the computer industry previously placed primary reliance on magnetic disks and tape for storage and retrieval of information in digital format. Now compact disks "CDs" have become widely used in the computer industry for the same purpose. Often, a particular type of media has two or more size formats. For example, flexible ("floppy") disks typically come in a 5.25 or 3.5 inch size. Recently, computer equipment manufactures have introduced high-capacity storage cartridges for performing the same functions as floppy disks, which have yet another size format.

The increase in the different sizes and types has created a need for storage devices capable of efficiently storing different types and/or sizes of media. The present invention provides a solution for that need.

SUMMARY OF THE INVENTION

A device for storing substantially planar media comprises a base having sidewalls and a containing area located between the sidewalls, and a tile having a plurality of holders for storing the substantially planar media and having an outer shape designed so as to be received within the containing area of the base and further designed, in conjunction with the containing area of the base, where the tile may be arranged within the containing area of the base in first and second orientations with the first orientation preferably being substantially orthogonal to the second orientation.

In a first embodiment of the invention the base includes a first plurality of pegs extending from the first sidewall into the containing area and a second plurality of pegs extending from a second sidewall into the containing area. Each of the first plurality of pegs is aligned with a peg in the second plurality of pegs, with the pegs within each group of pegs being spaced relative to the other pegs within that group a distance which is slightly greater than the width of the substantially planar media. The first plurality of pegs and the second plurality of pegs are thus positioned such that an end of one of the substantially planar media may be extended between a pair of adjacent pegs of the first plurality of pegs and the corresponding aligned pair of pegs to the second plurality of pegs and may rest against a position located near the bottom of the base such that the substantially planar media is held upwards by the two pairs of pegs.

The tile of the first embodiment of the present invention preferably includes first and second sidewalls, a containing surface located above and between the first and second sidewalls, a first plurality of pegs located adjacent the first sidewall, and a second plurality of pegs located adjacent the second sidewall. Substantially planar media may be held between a pair of adjacent pegs of the first plurality of pegs and a pair of adjacent pegs in the second plurality of pegs. Most preferably, central crowns are located between adjacent pairs of pegs in the first plurality of pegs and the second plurality of pegs. Additionally, each of the pegs in the first and second plurality of pegs include flared portions along the top edge of the pegs extending inward toward an adjacent peg. The tile also includes a retaining edge and a support edge formed by a slot in the interior of the tile. The retaining edge is located at the top edge of the slot and the support edge is located lower than the retaining edge on an opposite side of the slot such that a substantially planar media can be held in the slot in a tilted position by the retaining edge and the support edge.

In a second preferred embodiment of the present invention, the base includes a first set of pegs and a second set of pegs, both of which are cantilevered inward from along both sidewalls of the base toward the interior of the base. The first set of pegs extend generally parallel to the width dimension of the base at a generally uniform elevation above the second set of pegs, which also extend generally parallel to the width dimension of the base. Each peg of the first set of pegs and of the second set of pegs substantially aligns with a directly opposite peg on the other sidewall. The spacing between each of the first set of pegs is slightly greater than the thickness of a planar media such that the planar media easily slides edgewise between adjacent pegs of the first set of pegs. The second set of pegs located below the first set of pegs are in a staggered orientation with respect to the first set of pegs such that a peg from the second set of pegs will support the bottom of the planar media when the planar media is placed between adjacent pegs of the first set of pegs.

Preferably, in the second embodiment of the present invention, the tile includes a plurality of exterior channels, most preferably formed by exterior partitions with flared ends, that align with opposing channels on the opposing sidewall also preferably formed by exterior partitions with flared ends. The width of the exterior channels is slightly larger than the depth of a first type of planar media such that the planar media can be placed in two opposing exterior channels and between two pair of opposing exterior partitions such that the planar media can be held in an upright but tilted position. Most preferably in the second embodiment of the present invention, the tile includes a floor located at a depth greater than that of the exterior channels. The floor is bounded by two interior sidewalls that run parallel with the exterior sidewalls of the tile. Each interior sidewall, in conjunction with a pair of interior partitions, forms an interior channel. The portion of the interior sidewall that forms each interior channel includes a notch therein. Thus, the interior channels, interior partitions and notches located adjacent one interior sidewall are aligned with opposing interior channels, interior partitions and notches on the other sidewall. The distance between two opposing notches is slightly larger than the width of a second type of planar media such that the second type of planar media can fit between the two opposing notches in two opposing interior channels. A third type of planar media having, for example, a pair of beveled corners and a thickness greater than the notches may also be held on the floor of the tile between two opposing interior channels and two pair of opposing interior partitions in a tilted but upright manner such that the beveled corners do not engage the notches. Finally, a fourth type of planar media can be retained within a plurality of grooves in the floor of the tile. Each groove preferably is located adjacent a pair of opposing interior channels and between two pairs of opposing interior partitions. Each groove is most preferably comprised of two troughs connected by a common central crown with each trough having a side crown on its remote end and a central depression between the central crown and the side crown. Thus, the greatest depth of the trough is located at the central depression with the shallowest location being at the central crown and side crown such that an arcuate indentation is formed by each of the two troughs. Thus, a fourth planar media can be held within the central depression of either of the two troughs, or can straddle the two troughs at the location of the central crown.

DESCRIPTION OF THE DRAWINGS

The foregoing aspects and many of the attendant advantages of this invention will become more readily appreciated as the same becomes better understood by reference to the following, detailed description, when taken in conjunction with the accompanying drawings, wherein.

DETAILED DESCRIPTION OF THE PREFERRED EMBODIMENTS

Figure 1:
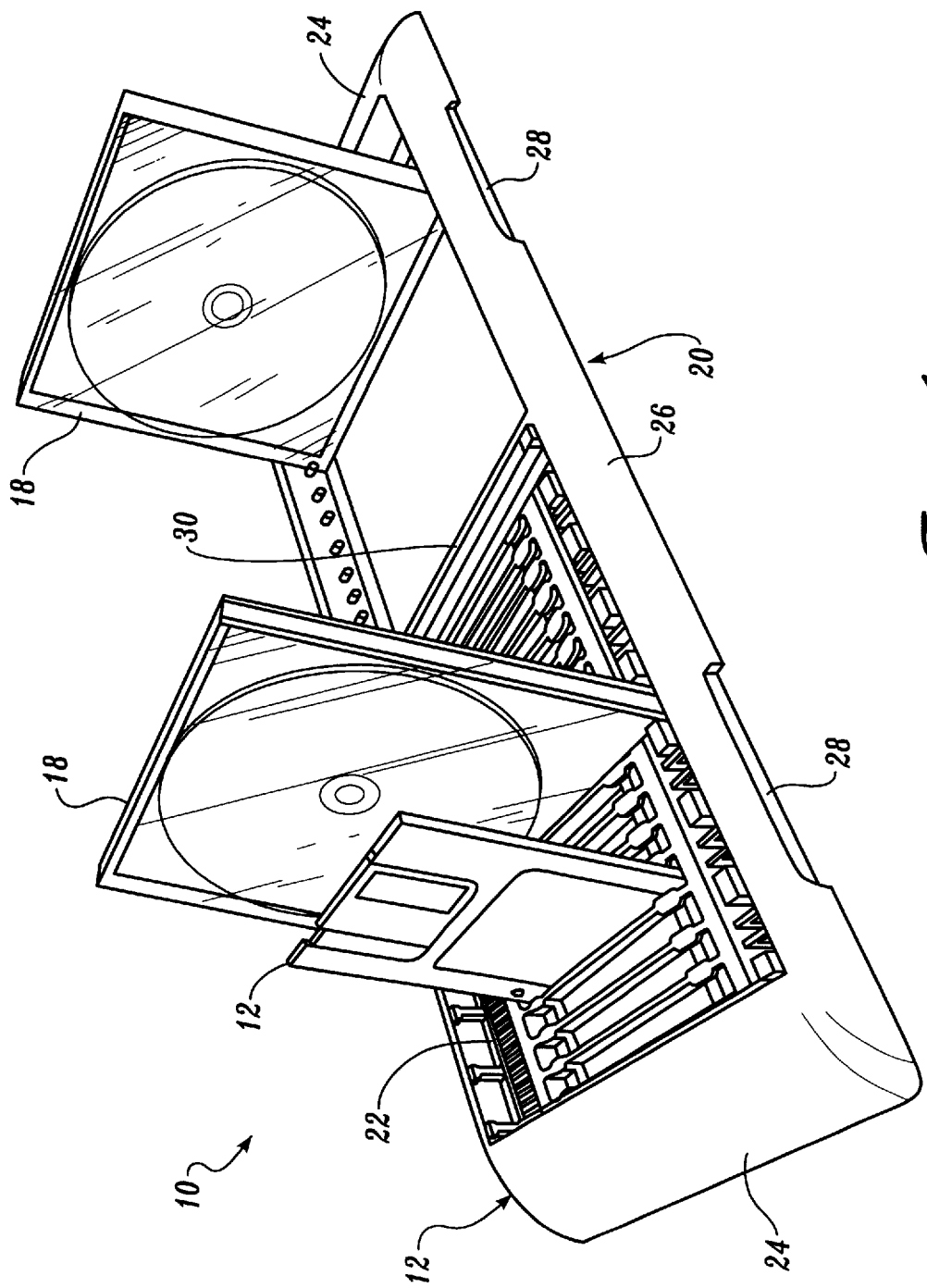
FIG. 1 illustrates a perspective view of a multimedia storage device in accordance with the first embodiment present invention holding different kinds and sizes of media.

FIG. 1 illustrates a perspective view of a multimedia storage device 10 in accordance with a first embodiment of the present invention. The device 10 holds media that stores information in formats suitable for use by electronic devices, such as flexible (floppy) disks, data cartridges, compact disks and boxes for compact disks, generally called jewel cases. Each of these media is substantially planar or flat in construction. In this regard, FIG. 1 illustrates the device 10 holding a floppy disk 12 and two CD jewel cases 18 by way of illustrative example.

Figure 4:
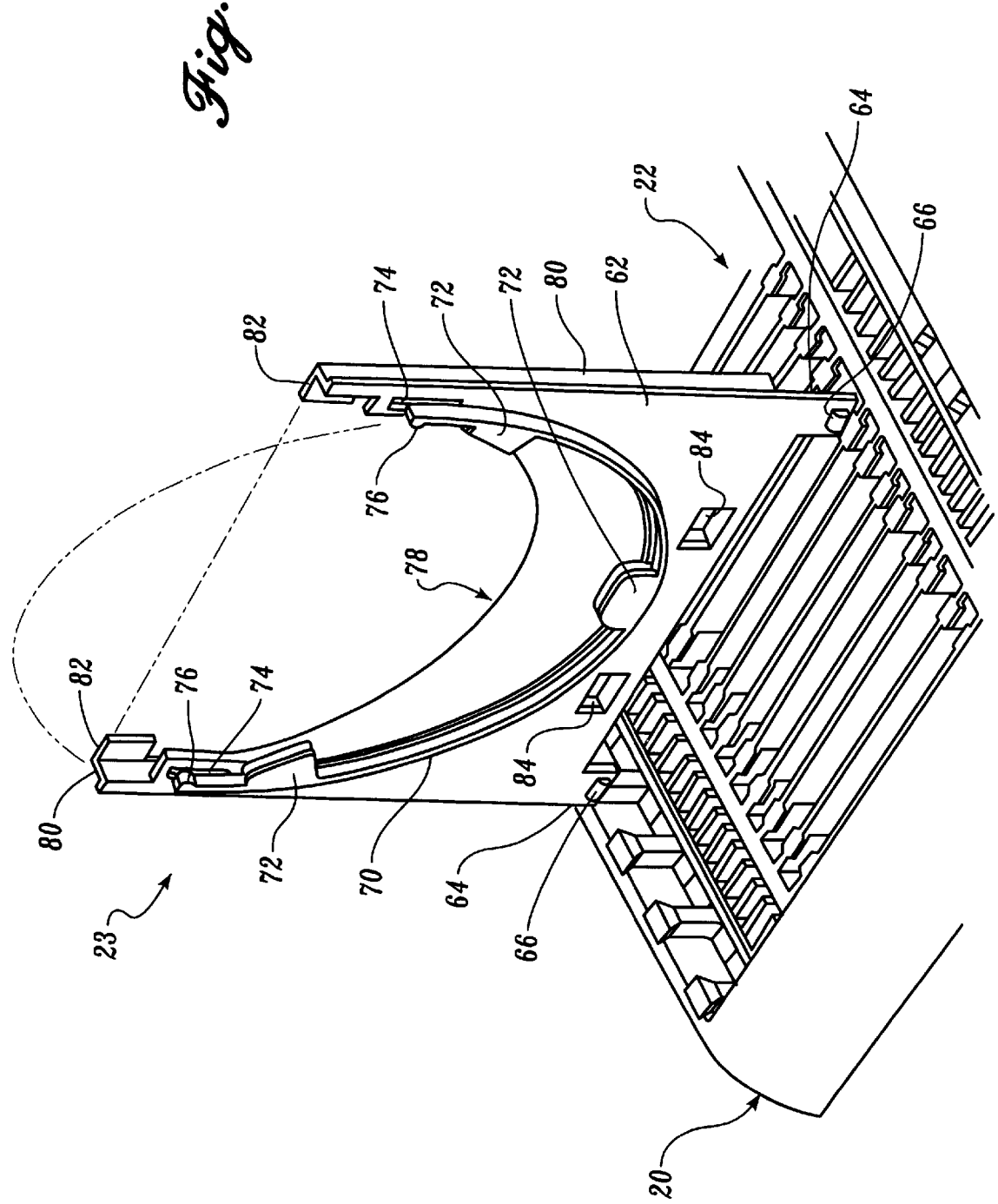
FIG. 4 illustrates an enlarged perspective view of a CD divider and part of the device of FIG. 1 with the CD divider spaced from the device.

The device 10 includes an assembly of two principal components: a base 20 and tiles 22 that insert into base 20. The device 10 additionally includes CD dividers 23, one of which FIG. 4 illustrates, for optional connection to the tiles 22.

The base 20 serves as the supporting foundation for the device 10 and has an outer periphery forming a generally rectangular shape when viewed from the top. For stability, the bottom of the base 20 has a length slightly greater than the top of the base 20. End walls curve convexly upward from the bottom edges of base 20 to the top to form rounded exterior ends 24 for the base 20. The side walls 26 extend along a plane projecting generally straight upwards from the bottom edges to the top edges of base 20. The base 20 includes recesses 28 formed along the bottom edge of base 20; finger grips to facilitate grasping and moving the device 10. Each side of each half of the base 20 includes a recess 28 extending centrally along the bottom edge of that half of base 20. The rounded exterior ends 24 may also include one or more recesses (not shown) for finger grips.

The base 20 includes a central divider 30. The central divider 30 extends across the width of the base 20 and divides the base 20 into two substantially identical halves. FIG. 1 illustrates a tile 22 inserted into one of the halves, with no tile inserted into the other half As explained in more detail later, a tile 22 can be inserted into either half.

Figure 2:
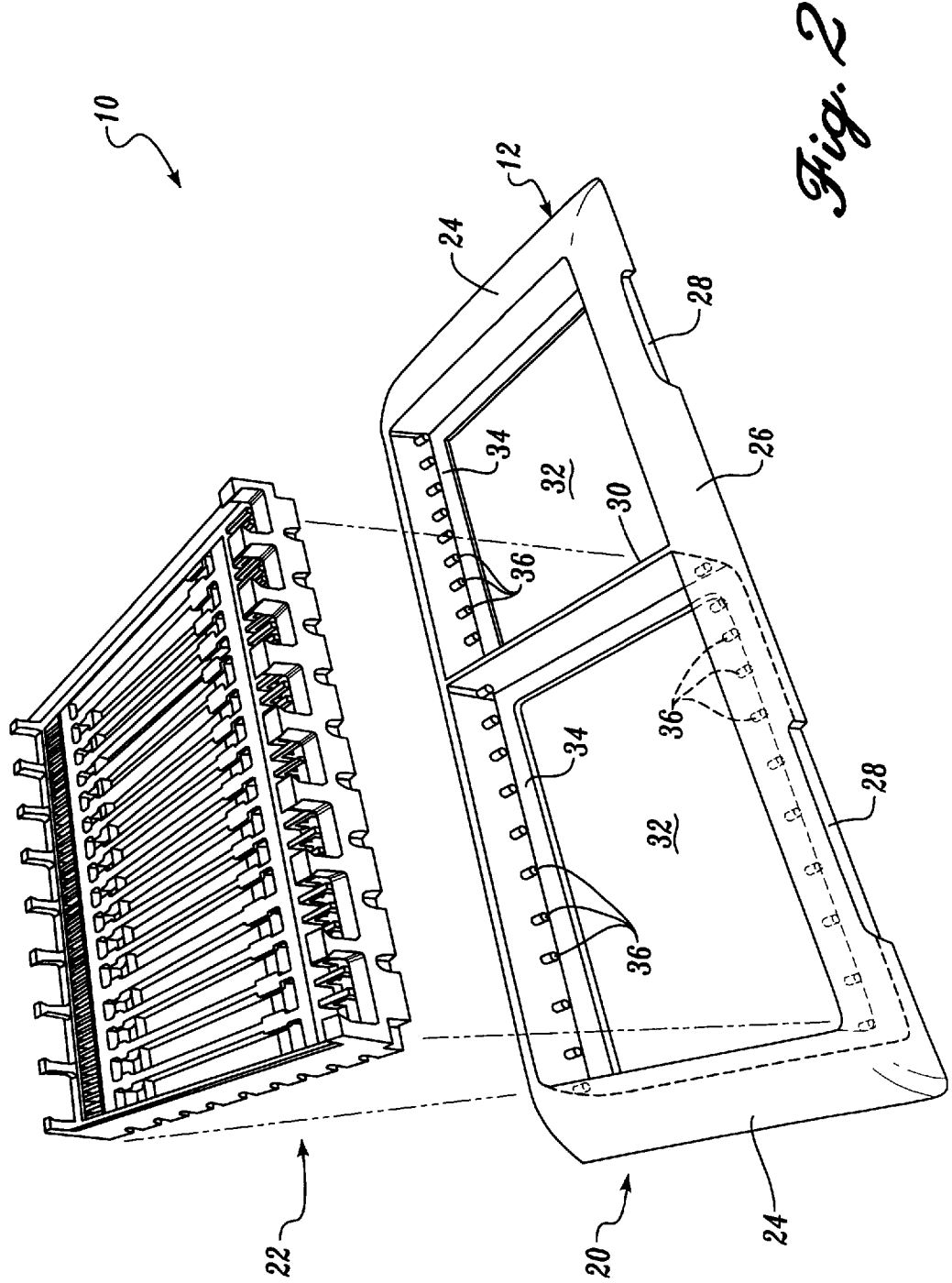
FIG. 2 illustrates a perspective view of the base and tile from the device of FIG. 1, with the media removed and tile exploded away from the base.

Referring to FIG. 2, each half of the base 20 includes an open, generally square-shaped area 32. Each square-shaped area 32 resides centrally in its respective half. The central divider 30 forms a common wall bounding one side of each of the square-shaped areas 32. The top edge of a rounded exterior end 24 bounds a side opposite central divider 30 for each of the square-shaped areas 32. The side walls 26 of the base 20 bound the remaining sides of the square-shaped areas 32. A lip 34 extends around the periphery of the lower edge of each of the square-shaped areas 32. Specifically, the lip 34 cantilevers orthogonally inward from along the bottom edge of each of the square-shaped areas 32.

A plurality of pegs 36 cantilever inward from along both side walls 26 of the base 20 into each of the square-shaped areas 32. The pegs 36 extend generally parallel to the width dimension of the base 20 at a generally uniform elevation above the lip 34. Each peg 36 of a side wall 26 substantially aligns with a directly opposite peg on the other side wall. The pegs 36 include a substantially regular spacing from one peg to the next along each side wall 26. This spacing between each peg 36 is slightly greater than the thickness of a standard CD jewel case 18.

Hence, a standard CD jewel case 18 easily slides edgewise between adjacent pegs 36. This feature permits the base 20 to be used in a stand-alone configuration for holding CD jewel cases 18. More particularly, the length of square-shaped areas 32 are slightly greater than the length of a standard CD jewel case 18. Standard CD jewel cases can thus slide into a square-shaped open area 32 with the length dimension of the cases 18 generally parallel to the width of the base 20. The lip 34 of each square shaped area 32 limits the depth to which the cases 18 can slide in this orientation. In this orientation, each case 18 slips between adjacent pegs 36 of a side wall 26 and corresponding pegs 36 on the opposite side wall 36. The distance between adjacent pegs 36 allows each case 18 to tilt slightly from vertical, either toward or away from central divider 30. The lip 34 and pegs 36 of each square-shaped area 32 thus support and organize the cases 18 in a tilted, but generally upright configuration for convenient access. In this regard, FIG. 1 illustrates the half of the base 20 without a tile 22 supporting a CD jewel case 18.

FIG. 1 illustrates the pegs 36 as being generally circular in cross-section. However, the pegs 36 can have cross-sectional areas forming many different shapes, such as oval, tear-drop, triangular, etc.

Figure 3:
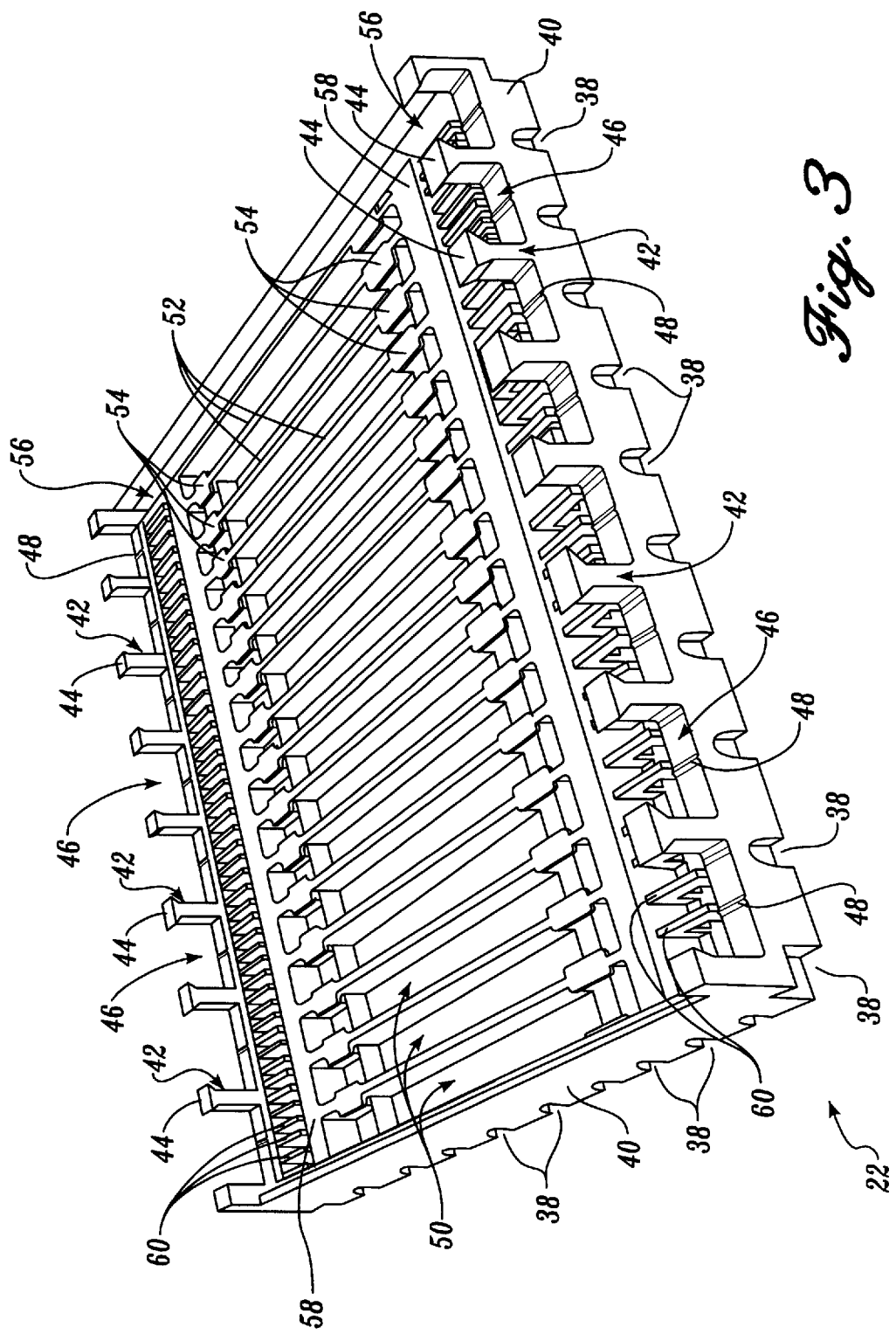
FIG. 3 illustrates a perspective view of tile from the device of FIG. 1.

As previously discussed, the base 20 can also be used with one or more tiles 22. More particularly, each square-shaped area 32 can receive a single tile 22. Viewed from the top, each tile 22 has an outer periphery forming a generally square shape. Each side of the square shape generally corresponds to the length of a standard CD jewel case 18. Thus, the tiles 22 can slide into the square-shaped areas 32 in the base 20. Referring to FIG. 3, each tile 22 has notches 38 formed along the bottom edge of each side wall 40 of the tile 22. The notches 38 correspond in spacing to the spacing between the pegs 36 of the base 20. Additionally, the notches 38 have a height exceeding the elevation of the pegs 36 above the lip 34 of square-shaped area 32 in the base 20. Thus, the notches 38 receive the pegs 36 when the tiles 22 slide into the square-shaped areas 32 of the base 20. In this arrangement, the lip 34 of a square-shaped area 32 supports the bottom surface of a tile 22.

Posts 42 project orthogonally upward from the upper edges of two side walls 40 of each tile 22. The posts 42 extend along opposite side walls 40, with each post substantially aligning with a directly opposite post on the opposing side wall. Each post 42 includes a flared distal end 44. The distal end 44 of each post 42 flares toward each adjacent post of that side wall 40. The distance between a flared tip of one post 42 and the nearest flared tip of an adjacent post is slightly greater than the depth or thickness of a standard CD jewel case 18. Thus, a standard CD jewel case 18 easily slides edgewise between the flared ends 44 of adjacent posts 42.

Adjacent posts 42 define a notch 46 therebetween. Each notch 46 includes a crowned bottom. Specifically, the bottom of each notch 46 slopes upward to a central crown 48 that has an elevation slightly greater than the corners of each notch. Thus, each notch 46 can support a standard CD jewel case 18 in a tilted, but generally upright orientation as shown in FIG. 1. More particularly, the tiles 22 receive standard CD jewel cases 18 with the width of each case extending between the posts 42 of opposite side walls 40. The cases 18 slide edgewise between adjacent posts 42 of a side wall 40 and corresponding posts on the opposite side wall. The crowned bottoms 48 in the notches 46 cause the cases 18 to tilt slightly from vertical for convenient access. Further, the flared ends 44 of the posts 42 catch the bottom edges of the cases 18 and prevent the cases from tilting excessively or from possibly falling.

The square shape of the tiles 22 permits each tile to insert into the base 20 in two principal orientations. First, the tiles 22 can be inserted into the base for holding CD jewel cases 18 with each case facing toward an end 24 of the base 20 as shown in FIG. 1. Additionally, each tile 22 may also be rotated ninety degrees from the orientation shown in FIG. 1 for holding CD jewel cases 18 facing toward a side wall 26 of the base 20. As previously described, the tiles 22 include notches 38 along each bottom edge of the tile for receiving the pegs 36 in the base 20 when the tile 22 is in any of the previously described orientations.

Each tile 22 can also support floppy disks 12 along with CD jewel cases 18 as shown in FIG. 1. For this purpose, each tile 22 includes a plurality of channels 50 defined along the upper surface of the tile as identified in FIG. 3. The longitudinal axes of the channels 50 extend orthogonally to the side walls 40 of the tile 22 having the posts 42. An edge of a floppy disk 12 inserts into one of the channels 50 for supporting the disk in the tilted, but generally upright orientation shown in FIG. 1.

The width of a channel or channels 50 can, of course, be modified for supporting other items, such as data cartridges, floppy disks in a single-disk case, tapes, etc. In this regard, the spacing between the posts 42 of a tile 22 can also be modified for receiving items other than standard CD jewel cases 18, such as larger size floppy disks (relative to the disk 12 shown in FIG. 1) and other items.

The channels 50 extend centrally along the upper surface of each tile 22, with a wall 52 separating one channel from another. Each wall 52 includes a flared portion 54 a spaced distance from each opposite end of the wall. The flared portions 54 extend orthogonally from the upper edge of each wall 52 towards an adjacent wall. The spacing between the edge of a flared portion 54 of one wall 52 and the nearest edge of the flared portion of an adjacent wall is slightly greater than the thickness of a floppy disk. A floppy disk 12 can thus slide edgewise into the channels 50, and the flared portions 54 catch the bottom edges of the disk for preventing the disk from tilting excessively or possibly falling.

Each tile 22 additionally includes two cross-channels 56. A side wall 40 of the tile 22 having the posts 42 forms one wall of each cross-channel 56. The other wall 58 of each cross-channel 56 forms an end for each of the other channels 50 in the tile 22.

A plurality of U-shaped members 60 extend along the bottom of the cross-channels 56. The legs of the U-shaped members 60 connect to the bottom of the cross-channels 56 such that the U-shape is inverted. Within the cross-channels 56, the legs of each U-shaped member 60 lie along a line generally orthogonal to the length of the channel. As described in the following paragraphs, the U-shaped members 60 serve as a connection point for CD dividers 23 as shown in FIG. 4.

Referring to FIG. 4, each CD divider 23 includes a base plate portion 62. A tab 64 projects from each lower corner of the CD divider 23. The tabs 64 each form a generally rectangular shape, and project generally along the plane of the base plate 62. When each CD divider 23 connects to a tile 22, the tabs 64 extend downward into the cross-channels 56, between adjacent U-shaped members 60. Thus, the CD divider 23 has a width corresponding approximately to the distance between the inner side of the outside wall of one cross-channel 56, and the inner side of the outside wall of the other cross-channel.

Each tab 64 additionally includes a rib 66 projecting from each side of the tab. The ribs 66 project from proximate the distal ends of the tabs 64, generally parallel to the tab's end edge. When the tabs 64 insert between two U-shaped members 60 in a tile 22, the ribs 66 project between the legs of the U-shaped members 60 for holding the CD divider 23 in place. The tabs 64 initially must be force-fit between adjacent U-shaped members 60. However, as soon as the ribs 66 move below the "bridge" of the U-shaped members 60, the CD divider 23 "snaps" into place. In this regard, the device 10 is preferably formed of plastic such that the U-shaped members 60 flex for insertion of the CD divider 23.

An arcuate rim 70 projects orthogonally from one side of the CD divider's base plate 62. The rim 70 curves concavely upward away from the end of the divider 23 with the tabs 64. The arc formed by the rim 70 corresponds to the curvature formed by the outer circumference of a standard CD. Thus, a standard CD "nests" within the arc formed by the rim for holding the CD. That is, the rim 70 bears against the edge of the CD for holding the CD in place. Additionally, the rim 70 includes tabs 72. The tabs 72 project generally parallel to the surface of the base plate 62 and extend partially over the concavity defined by the arcuate rim 70. When a CD nests in the arc of the rim 70, the tabs 72 act against the side of the CD for retaining the CD in place. Each of the tabs 72 overlie a cut-out in the base plate 62 corresponding in shape to the respective tab.

Each end of the rim 70 cantilevers over a generally rectangular cut-out 74 in the base plate 62 of the CD divider 23. Additionally, the tip of each end of the rim 70 includes a knob 76. When a CD nests within the arc of the rim 70, the knobs 76 resiliently bear against the edge of the CD for holding the CD in place.

The end of the base plate 62 opposite the tabs 64 includes an arcuate cut-out 78. The edge of the cut-out 78 extends a spaced distance above and along the rim 70. The cut-out 78 facilitates grasping a CD for removal and insertion from the CD divider 23.

The side of the CD divider 23 opposite the arcuate rim 70, includes two L-shaped rims 80. The longer legs of the L-shaped rims 80 extend along opposite sides of the CD divider 23. In particular, each longer leg of the L-shape extends from the upper end of the CD divider 23, to a location past the bottom of the curve of the arcuate rim 70. At this location, the shorter leg (not visible) of each L-shaped rim 80 extends along the base plate 62 towards the other L-shaped rim 80.

Two L-shaped tabs 84 project from this side of the CD divider 23 between the shorter legs of the L-shaped rims 80. One leg of the L-shapes projects orthogonally from the surface of the base plate 62 and the other leg extends upward, generally parallel to the surface of the base plate 20. The upwardly extending leg overlies a cut-out in the base plate surface corresponding in shape to this leg of the tab 84. The other leg of the tab 84 extends from the lower edge of this cut-out.

A tab 82 additionally projects from each upper end of the longer legs of the L-shaped rims 80. Each tab 82 forms a generally rectangular shape and connects along one of its longer edges to the L-shaped rim 80. These tabs 82 extend generally parallel to the surface of the base plate 62 towards one another.

The L-shaped rims 80 and tabs 82 and 84 form an arrangement for receiving media having a rectangular shape, such as floppy disks. The edges of the disk bear against the L-shaped rims 80 and the L-shaped tabs 84. The tabs 82 on the L-shaped rims 80 act against the surface of the disk for retaining the disk in place. Additionally, the upward extending leg of the L-shaped tabs 84 also function in this manner. Thus, each CD divider can hold a CD on one side and a floppy disk on the reverse side.

The tiles 22 can also be used in a stand-alone configuration without being inserted into a base 20. In particular, the tiles 22 may be placed on a surface, and used to hold media as described above. Further, the tiles 22 may be placed in other containers for holding media. In particular, the tiles 22 can be placed in media storage containers, known as tubs in the computer industry, for holding media without being inserted into a base 20.

Figure 5:
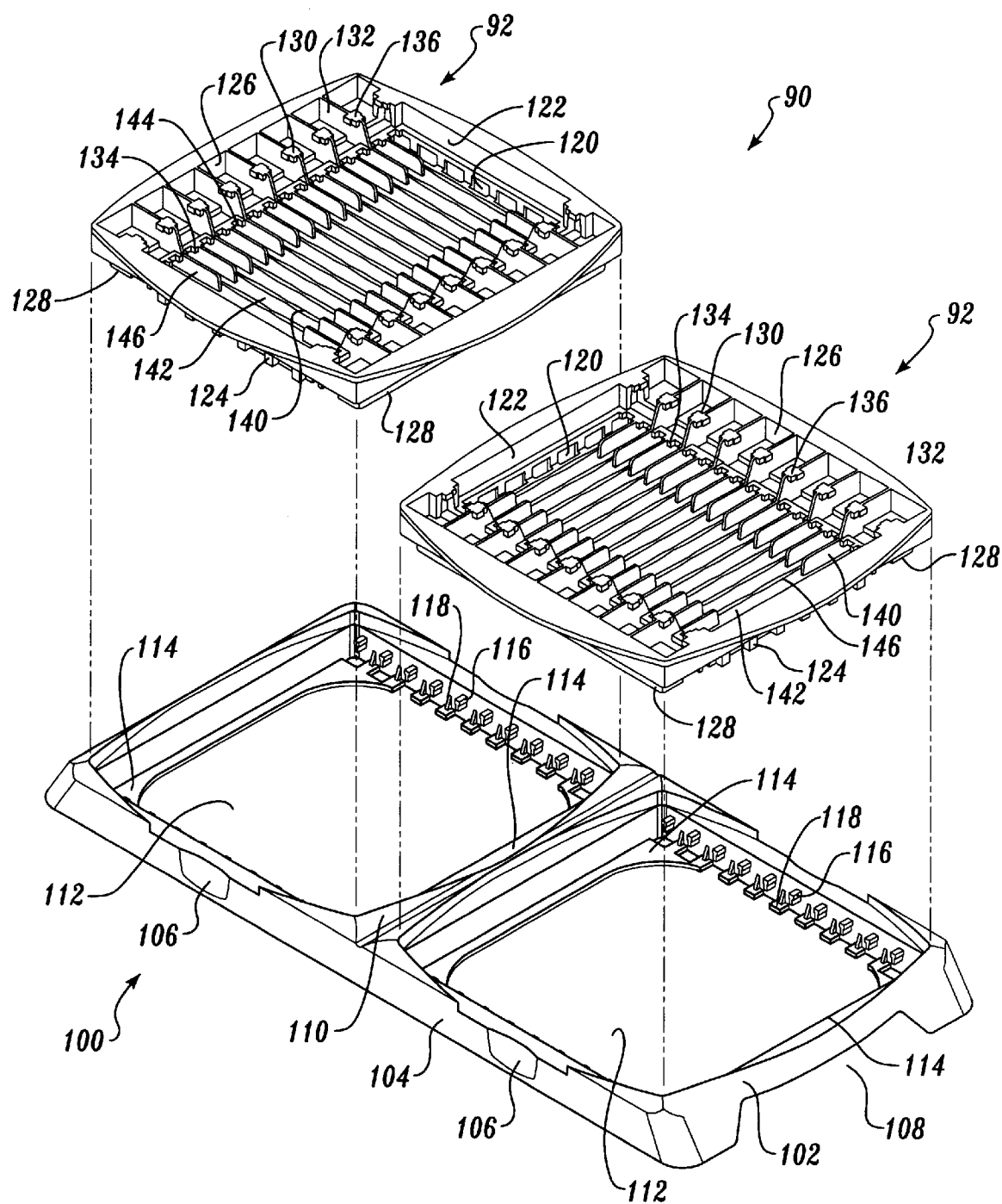
FIG. 5 illustrates a perspective view, exploded, of a multimedia device in accordance with the second embodiment of the present invention.
Figure 6:
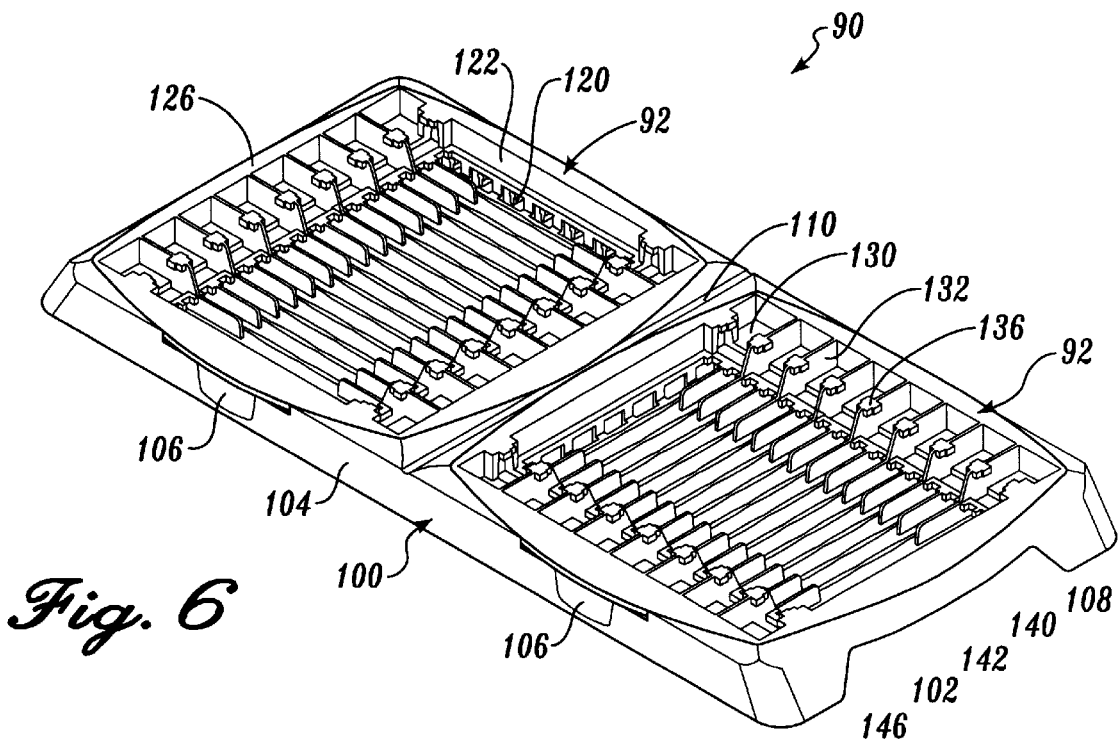
FIG. 6 illustrates a perspective view of a multimedia storage device in accordance with the second embodiment of the present invention.
Figure 7:
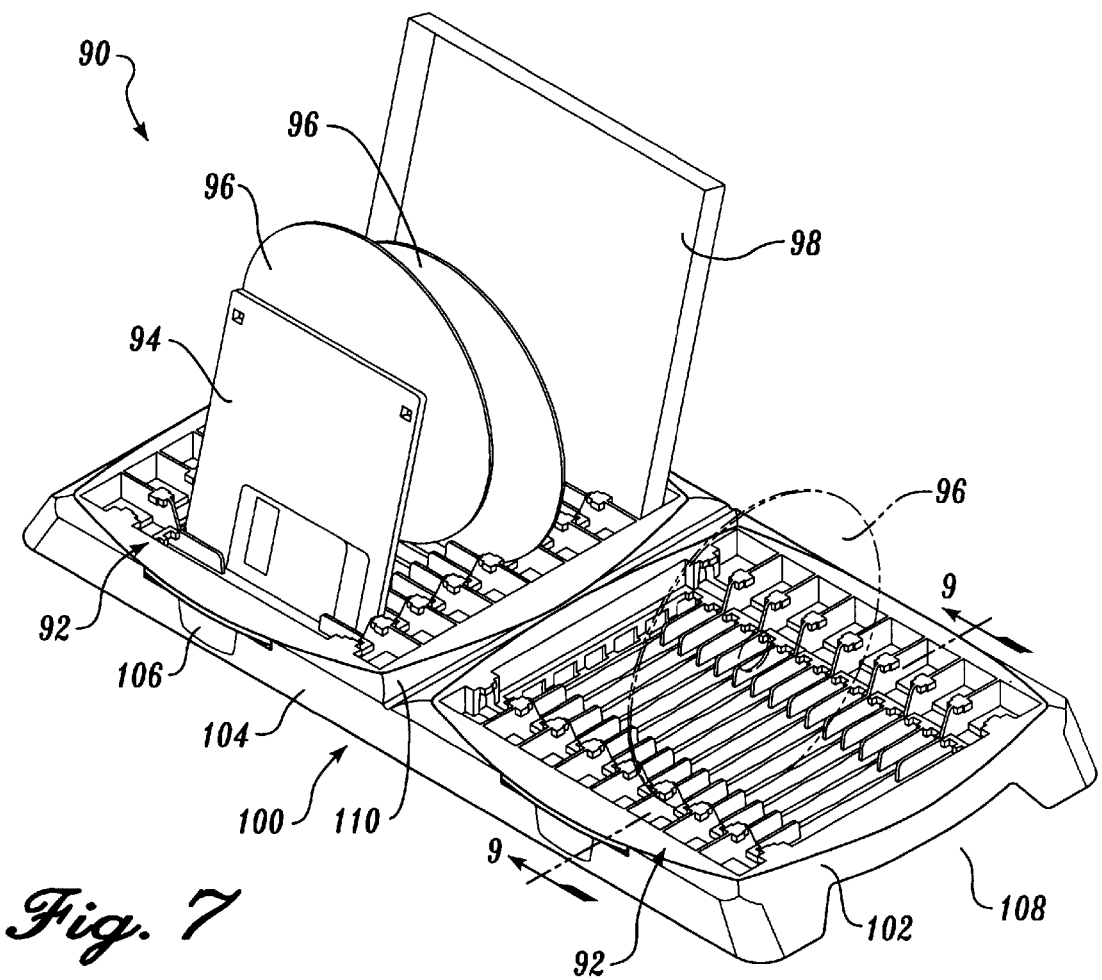
FIG. 7 illustrates a perspective view of a multimedia storage device in accordance with the second embodiment of the present invention with the tiles thereof holding different kinds and sizes of media.
Figure 8:
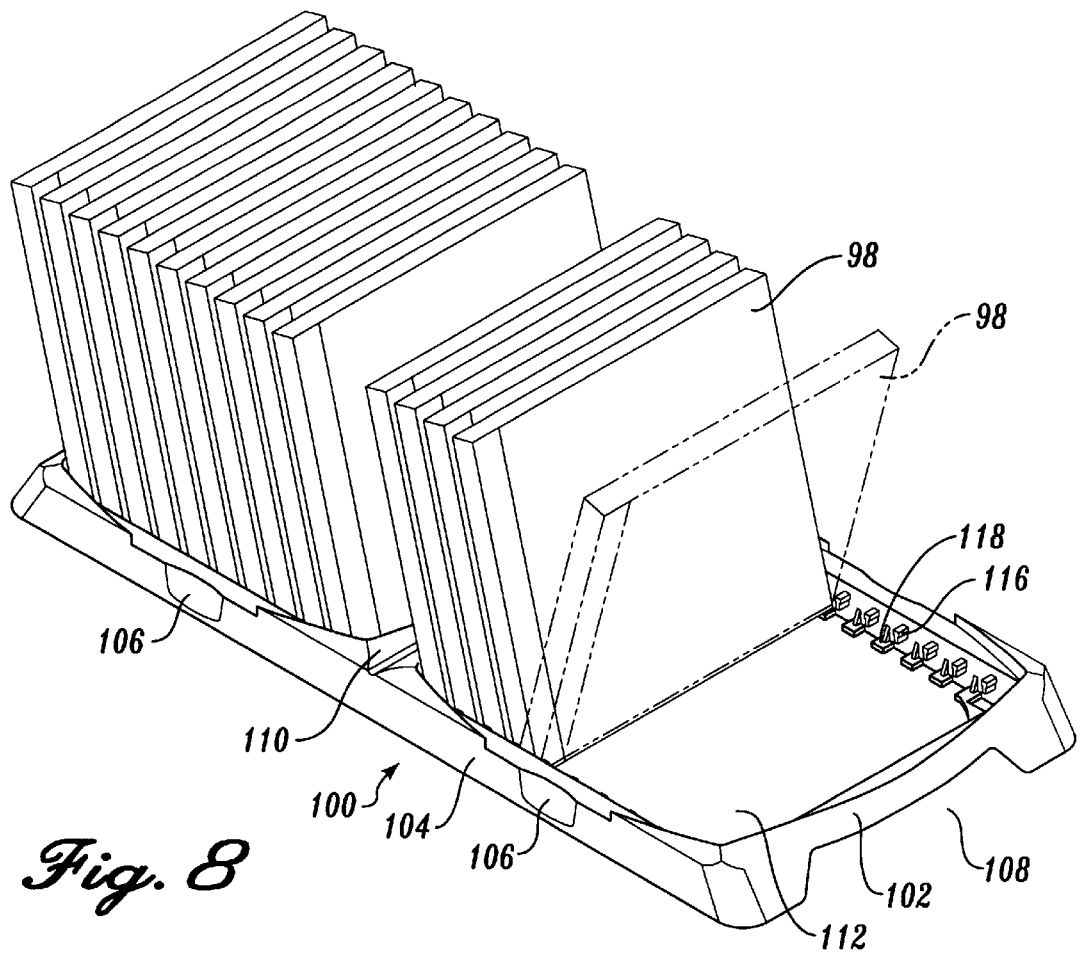
FIG. 8 illustrates a perspective view of the base from the multimedia storage device in accordance with the second embodiment of the present invention holding media.
Figure 9:
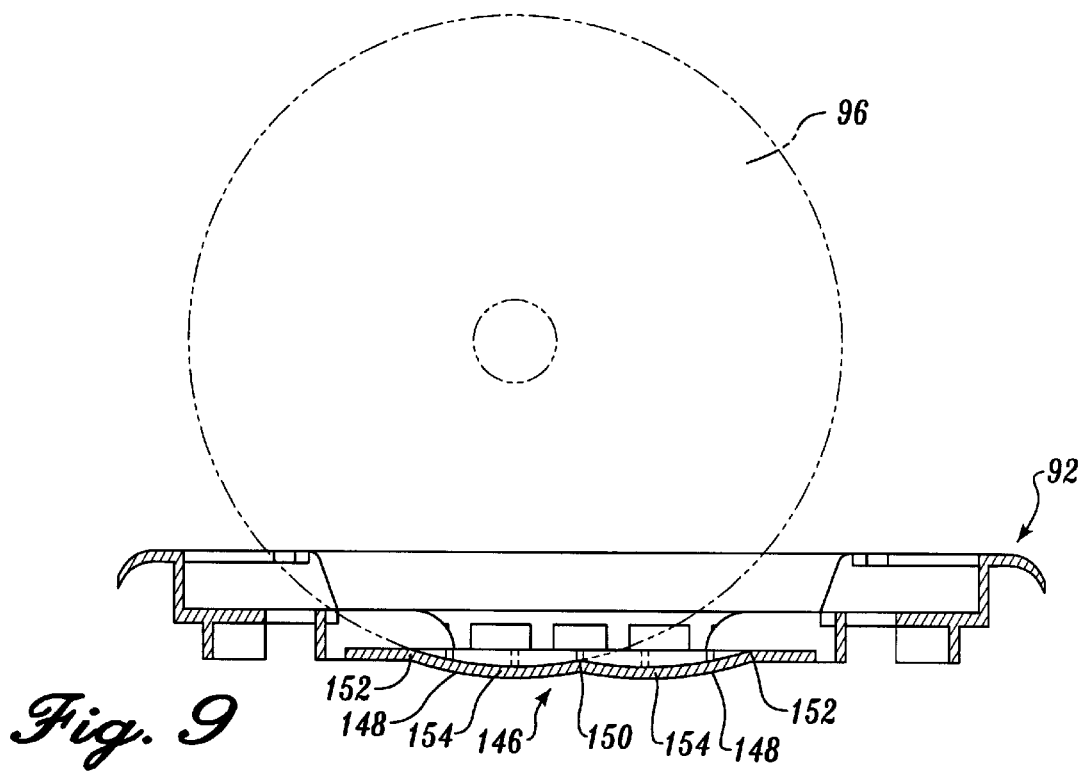
FIG. 9 is a cross-sectional detailed view taken along line 9—9 of FIG. 7 showing the tile portion of the multimedia storage device of the present invention holding a compact disk.
Figure 10:
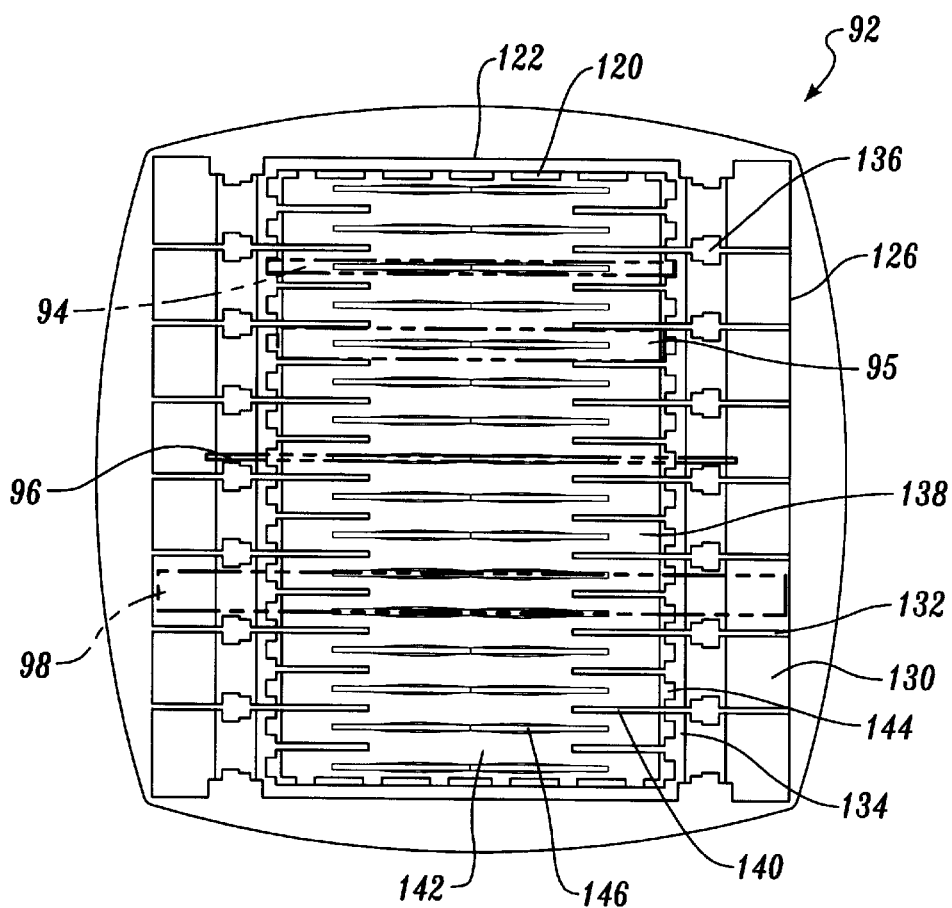
FIG. 10 is a top view of the tile portion of the multimedia storage device in accordance with the second embodiment of the present invention.

FIGS. 5–11 illustrate a multimedia storage device 90 in accordance with a second embodiment in the present invention. The device 90 holds media that stores information in formats suitable for use by electronic devices, such as flexible (floppy) disks, data cartridges, compact disks and boxes for compact disks, generally called jewel cases. Each of these media is substantially planar or flat in construction. In this regard, FIG. 7 illustrates tile 92 of the device 90 holding a floppy disk 94, three CDs 96 and a CD jewel case 98. FIG. 8 shows base 100 of device 90 holding a plurality of CD jewel cases 98. FIG. 10 shows tile 92 holding a floppy disk 94, a high density disk 95, a compact disk 96, and a CD jewel case 98, in phantom lines.

As stated, the device 90 includes an assembly of two principal components: a base 100 and tiles 92 that insert into base 100. Referring to FIGS. 5 and 6, the base 100 serves as the supporting foundation for the device 90 and has an outer periphery forming a generally rectangular shape when viewed from the top. For stability, the bottom of the base 100 has a length slightly greater than the top of the base 100. End walls curve convexly upward from the bottom edges of base 100 to the top to form rounded exterior ends 102 for the base 100. The side walls 104 extend along a plane projecting generally straight upwards from the bottom edges to the top edges of base 100. The base 100 includes side recesses 106 formed along the bottom edge of the base 100; finger grips to facilitate grasping and moving the device 90. Each side of each half of the base 100 includes a side recess 106 extending centrally along the bottom edge of that half of base 100. The rounded exterior ends 102 may also include one or more end recesses 108 for finger grips. The base 100 includes a central divider 110. The central divider 110 extends across the width of the base 100 and divides the base 100 into two substantially identical halves.

Referring to FIG. 5, each half of the base 100 includes an open, generally square-shaped area 112. Each square-shaped area 112 resides centrally in its respective half The central divider 110 forms a common wall bounding one side of each of the square-shaped areas 112. The top edge of a rounded exterior end 102 bounds a side opposite central divider 110 for each of the square-shaped areas 112. The side walls 104 of the base 100 bound the remaining sides of the square-shaped areas 112. Lips 114 adjacent rounded exterior ends 102 and adjacent central divider 110 extend from the lower edge of each of the square-shaped areas 112. Specifically, the lips 114 cantilever orthogonally inward from along the bottom edge of each of the square-shaped areas 112.

A first set of pegs 116 and a second set of pegs 118 cantilever inward from along both side walls 104 of the base 100 into each of the square-shaped areas 112. The pegs 116 extend generally parallel to the width dimension of the base 100 at a generally uniform elevation above the lips 114 and pegs 118 also extend generally parallel to the width dimension of base 100 but are in plane with lips 114. Each peg 116 and 118 of a side wall 104 substantially aligns with a directly opposite peg on the other side wall. The pegs 116 and 118 include a substantially regular spacing from one peg to the next along each side wall 104. This spacing between each peg 116 is slightly greater than the thickness of a standard CD jewel case 98.

Hence, a standard CD jewel case 98 easily slides edgewise between adjacent pegs 116. Pegs 118 are located below pegs 116 and are in a staggered orientation with respect to pegs 116 such that a peg 118 will support the bottom of a jewel case 98 placed between adjacent pegs 116. This feature permits the base 100 to be used in a stand-alone configuration for holding CD jewel cases 98. Additionally, the length of square-shaped areas 112 are slightly greater than the length of a standard CD jewel case 98. Standard CD jewel cases 98 can thus slide into a square-shaped open area 112 with the length dimension of the CD jewel cases 98 generally parallel to the width of the base 100. Pegs 118 limit the depth to which the CD jewel cases 98 can slide in this orientation. In this orientation, each CD jewel case 98 slips between adjacent pegs 116 of a side wall 104 and corresponding pegs 116 on the opposite side wall 104. The distance between adjacent pegs 116 allows each case 98 to tilt slightly from vertical, either toward, or away from central divider 110. The pegs 116 and pegs 118 of each square-shaped area 112 thus support and organize the CD jewel cases 98 in a tilted, but generally upright configuration for convenient access. In this regard, FIG. 8 illustrates base 100 without tiles 92 supporting a CD jewel case 98. FIG. 5 illustrates the pegs 116 and 118 as being generally rectangular in cross-section. However, the pegs 116 and 118 can have cross-sectional areas forming many different shapes, such as circular, square, oval, tear-drop, triangular, etc.

As previously discussed, the base 100 can also be used with one or more tiles 92. More particularly, each square-shaped area 112 can receive a single tile 92. Viewed from the top, as shown in FIG. 10, each tile 92 has an outer periphery forming a generally square shape. Each side of the square shape generally corresponds to the length of a standard CD jewel case 98. Thus, the tiles 92 can slide into the square-shaped areas 112 in the base 100. Referring to FIG. 5, each tile 92 has notches 120 formed along the bottom edge of side walls 122 of the tile 92. The notches 120 correspond in spacing to the spacing between the pegs 116 of the base 100. Thus, the notches 120 receive the pegs 116 when the tiles 92 slide into the square-shaped areas 112 of the base 100. Posts 124, interspaced between notches 120, are oriented to align with pegs 118 of base 100 when tile 92 is inserted therein. More specifically, the lower end of each post 124 is supported by a peg 118. Furthermore, the lips 114 of a square-shaped area 112 support the bottom surface of a tile 92.

Note that notches 120 and posts 124 are not present in side walls 126. Instead, the bottom edge of each side wall 126 has rib 128 located thereon that supports tile 92 on lips 114 in both orientations of tile 92 in base 100, discussed below. Ribs 128 are located inwardly with respect to pegs 116 and pegs 118 of tile 92 so as to clear pegs 116 and pegs 118 when tile 92 is oriented in base 100 with ribs 128 aligned in parallel with pegs 116 and 118.

The square shape of the tiles 92 permits each tile to insert into the base 100 in two principal orientations. As shown in FIG. 7, the tiles 92 can be inserted into the base 100 with each media facing toward an end 102 of the base 100, or each tile 92 may also be rotated ninety degrees from the above orientation for holding media facing toward a side wall 104 of the base 100.

Each tile 92 can support floppy disks 94, high density disks 95, compact disks 96, and CD jewel cases 98, as shown in FIG. 10 in phantom lines.

Referring to FIG. 10, the retention of a first substantially planar media, for example a CD jewel case 98, in tile 92 is first described. Tile 92 includes a plurality of exterior channels 130 located adjacent each of tile sidewalls 126. Exterior channels 130 are preferably formed by a plurality of exterior partitions 132. The longitudinal axes of exterior channels 130 and exterior partitions 132 extend orthogonally to sidewalls 126 of tile 92. Each exterior partition 132 terminates adjacent an interior sidewall 134, which runs parallel with tile sidewalls 126. Each exterior partition 132 includes a flared end 136 at its terminus adjacent interior sidewall 134. Each flared end 136 extends orthogonally from the upper edge of each exterior partition 132 toward an adjacent exterior partition 132. The space in between the edge of a flared end 136 of one exterior partition 132 and the nearest edge of the flared end 136 of an adjacent exterior partition 132 is slightly greater than the thickness of a CD jewel case 98. A CD jewel case 98 can thus slide edgewise into exterior channel 130, and the flared ends 136 of two adjacent exterior partitions 132 support the bottom edges of each side of the CD jewel case 98 to prevent the CD jewel case 98 from tilting excessively or possibly falling, while allowing CD jewel case 98 to be held tilted, but substantially upright.

Still referring to FIG. 10, the retention of second and third types of substantially planar media, for example floppy disks 94 and high density disks 95, in tile 92 is now described. Tile 92 includes a plurality of interior channels 138 located adjacent each of interior sidewalls 134 and defined by a plurality of interior partitions 140. The longitudinal axes of interior channels 138 and interior partitions 140 extend orthogonally to interior sidewall 134 of tile 92. Interior channels 138 and interior partitions 140 are located on floor 142 which has a depth a predetermined distance below that of exterior channels 130, exterior partitions 132 and the top surface of interior sidewall 134. The depth of floor 142 allows the first type of substantially planar media, for example CD jewel cases 98, to be placed over projecting components attached to floor 142 such as interior partitions 140. The portion of each interior sidewall 134 bounded by adjacent interior partitions 140 to form interior channels 138 each have therein a notch 144. Note that each interior channel 138, interior partition 140 and notch 144 located adjacent one interior sidewall 134 is aligned with an opposing interior channel 138, interior partition 140 and notch 144 adjacent the opposite interior sidewall 134. The distance between two opposing notches 144 is slightly larger than the width of a second type of planar media, for example floppy disk 94, such that floppy disk 94 can fit between the two opposing notches 144 in two opposing interior channels 138 such that the notches 144 hold floppy disk 94 in a tilted, but substantially upright position. A third type of planar media, for example a high density disk 95, having a thickness greater than the width of notches 144 can also be supported between two opposing interior channels 138 and two pair of opposing interior partitions 140 because high density disk 95 has a pair of bottom end beveled corners, the beveling of which prevents engagement of these two corners with notches 144. Additionally, the width of interior channels 138 as defined by the space between two adjacent interior partitions 140 is slightly larger than the thickness of high density disk 95 such that the two opposite sides of the bottom end of high density disk 95 are braced by two adjacent interior partitions 140 such that high density disk 95 is held substantially upright in a tilted position in an interior channel 138.

Figure 11:
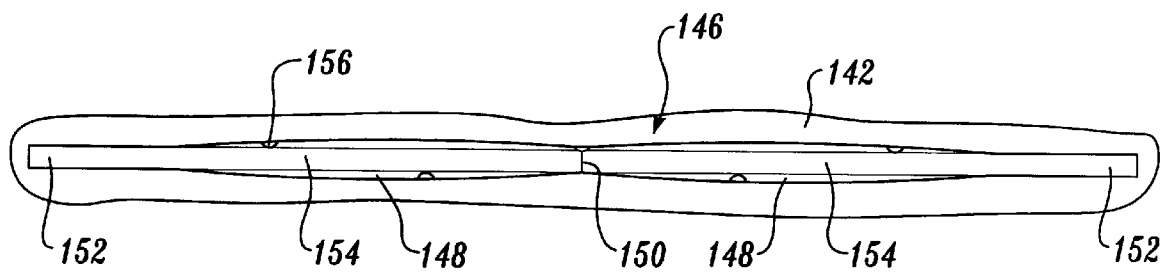
FIG. 11 is an enlarged detailed view of a groove in the tile portion of the multimedia storage device in accordance with the second embodiment of the present invention for holding a compact disk.

Finally, a forth type of planar media, for example a compact disk 96, can be retained on floor 142 of tile 92. As best shown in FIGS. 9, 10 and 11, floor 142 has therein a plurality of longitudinal grooves 146 oriented substantially perpendicular to interior sidewalls 134 and substantially parallel with interior partitions 140 and exterior partitions 132. Most preferably, each groove 146 is located between each opposing pair of interior channels 138 and between the two pairs of opposing interior partitions 140. Each groove 146 is most preferably comprised of two troughs 148 connected by a common central crown 150 with each trough 148 having a side crown 152 on its remote end and a central depression 154 between the central crown 150 and the side crown 152. Thus, the greatest depth of each trough 148 is located at the central depression 154, with the shallowest location of each trough 148 being at central crown 150 and side crown 152 such that, in cross section, an arcuate indentation is formed by each of the two troughs 148. Nipples 156 are located on both interior sides of each trough 148 and aid in the support of a compact disk 96 in trough 148. Each of troughs 148 is of a size and depth to receive a arcuate portion of compact disk 96 therein such that compact disk 96 is supported in a tilted, but generally upright orientation in one of troughs 148. It should be noted that while each of troughs 148 can be employed to hold a compact disk 96, only one compact disk at a time can be held in groove 146; therefore both troughs 148 of a groove 146 cannot hold a compact disk 96 at the same time. However, the existence of two troughs 148 comprising groove 146 allows the user to, if desired, stagger the storage orientation of adjacent compact disks 96 in adjacent grooves 146 such that a first compact disk 96 is located in the first trough 148 of a first groove 146 while a second compact disk 96 is located in the opposite, or second, trough 148 in a second groove 146. Furthermore, it should be noted that groove 146 is so configured that a compact disk 96 can straddle both troughs 148, being secured in a tilted but upright manner in groove 146 at central crown 150 where groove 146 is somewhat more constricted.

While the preferred embodiment of the invention has been illustrated and described, it will be appreciated that various changes can be made therein without departing from the spirit and scope of the invention as defined in the appended claims.

The embodiments of the invention in which an exclusive property or privilege is claimed are defined as follows:

1. A device for storing substantially planar media, the device comprising:
   a base comprising:
      a longitudinal axis;
      an outer periphery defining walls therearound, the walls including a bottom, a first sidewall, and a second sidewall opposite the first sidewall; and
      a containing area located between the walls;
   a tile comprising:
      a longitudinal axis;
      a plurality of holders for storing the substantially planar media; and
      an outer shape designed so as to be received within the containing area of the base, the containing area and the outer shape being configured such that the tile may be arranged within the containing area in first and second orientations, the first orientation being defined such that the longitudinal axis of the tile is substantially aligned with the longitudinal axis of the base and the second orientation being defined such that the longitudinal axis of the tile is no more than orthogonal with the longitudinal axis of the base.

2. The device of claim 1, wherein the containing area has a cross-section of a square.

3. The device of claim 1, wherein the sidewalls of the base comprise a rectangular shape.

4. The device of claim 3, the base further comprises a second containing area.

5. The device of claim 4, wherein both containing areas have a cross-section of a square.

6. The device of claim 1, wherein the base further comprises:
   a first plurality of pegs extending from the first sidewall into the containing area, each peg having at least a portion of which is spaced from the bottom of the base; and
   a second plurality of pegs extending from the second side wall into the containing area, each peg of the second plurality having at least a portion of which is spaced from the bottom, each of the first plurality of pegs being substantially aligned with a peg in the second plurality of pegs, the pegs of the first plurality of pegs being spaced relative to one another a distance which is slightly greater than the width of the substantially planar media, and the pegs of the second plurality of pegs being spaced relative to one another a distance which is slightly greater than the width of the substantially planar media, wherein the first and second plurality of pegs are positioned such that an end of one of the substantially planar media may be extended between a pair of adjacent pegs of the first plurality of pegs and a corresponding substantially aligned pair of pegs of the second plurality of pegs and may rest against a position located near the bottom of the base, and the substantially planar media will be held upwards by the two pairs of pegs.

7. The device of claim 6, wherein the base further comprises:
   a first lip cantilevered orthogonally inward from along the bottom of the first sidewall; and
   a second lip cantilevered orthogonally inward from along the bottom edge of the second sidewall.

8. The device of claim 6, wherein the sidewalls of the base comprise a rectangular shape.

9. The device of claim 8, wherein the base further comprises a second containing area.

10. The device of claim 9, wherein both containing areas have a cross-section of a square.

11. The device of claim 6, wherein the tile further comprises a plurality of notches for aligning with the first and second plurality of pegs on the base.

12. The device of claim 1, wherein the tile further comprises snap-in recesses aligned along two channels on opposite sides of the tile.

13. The device of claim 12, further comprising a divider for storing media, the divider comprising tabs for being received within the snap-in recesses.

14. The device of claim 13, wherein the divider includes holders for different sized media on opposite sides of the divider.

15. The device of claim 1, wherein the tile further comprises:
   an interior;
   a first sidewall;
   a second sidewall;
   a containing surface located above and between the first sidewall and the second sidewall;
   a first plurality of pegs located adjacent the first sidewall; and
   a second plurality of pegs located adjacent the second sidewall such that a substantially planar media may be held between both adjacent pegs in the first plurality of pegs and adjacent pegs in the second plurality of pegs.

16. The device of claim 15, further comprising a first central crown located between an adjacent pair of pegs of the first plurality of pegs, and a second central crown located between the corresponding substantially aligned pair of pegs of the second plurality of pegs.

17. The device of claim 16, wherein each of the pegs of the first and second plurality further comprises flared portions along a top edge extending inward toward an adjacent peg.

18. The device of claim 15, further comprising a retaining edge and a support edge formed by a slot in the interior, the second retaining edge being located at the top edge of the slot, and the support edge being located lower than the retaining edge and on an opposite side of the slot such that a substantial planar media can be held in the slot by the retaining edge and the support edge.

19. The device of claim 18, wherein the slot further comprises flared portions on the top part of the slot extending inward of the slot.

20. The device of claim 1, wherein the base further comprises:
- a first set of pegs at a first height including a first group of pegs extending from the first sidewall and a second group of pegs extending from the second sidewall and being substantially aligned with the first group of pegs of the first set, the pegs of the first set of pegs being spaced relative to one another a distance which is slightly greater than the thickness of the substantially planar media such that an end of the substantially planar media may be extended between adjacent pegs of the first group and of the second group of the first set of pegs; and
- a second set of pegs at a second height lower than the first height including a first group of pegs extending from the first sidewall and a second group of pegs extending from the second sidewall and being substantially aligned with the first group of pegs of the second set, the second set of pegs being staggered with respect to the first set of pegs such that aligned pairs of pegs of the first group and second group of the second set of pegs support an end of the substantially planar media.

21. The device of claim 1, wherein the tile further comprises:
- a first set of partitions adjacent said first sidewall; and
- a second set of partitions adjacent said second sidewall and aligned with said first set of partitions, each partition of the first set and of the second set being spaced from adjacent partitions a distance which is slightly greater than the thickness of the substantially planar media such that an end of the substantially planar media is supported by aligned pairs of partitions of the first set and second set.

22. The device of claim 21, wherein the first set of partitions and the second set of partitions have flared ends which support the end of the substantially planar media.

23. The device of claim 21, wherein the tile further comprises:
- a third set of partitions interior of the first set of partitions; and
- a fourth set of partitions interior of the second set of partitions and aligned with the third set of partitions, each partition of the third set and of the fourth set being spaced from adjacent partitions a distance which is slightly greater than the thickness of the substantially planar media such that an end of the substantially planar media is supported by aligned pairs of partitions of the third set and fourth set.

24. The device of claim 23, wherein the tile further comprises:
- a first interior wall adjacent to and substantially orthogonal to the third set of partitions, the first interior wall having a notch between each adjacent pair of partitions of the third set of partitions; and
- a second interior wall adjacent to and substantially orthogonal to the fourth set of partitions, the second interior wall having a notch between each adjacent pair of partitions of the third set of partitions, the notches in the first interior wall and in the second interior wall having a width slightly greater than the thickness of the substantially planar media such that an end of the substantially planar media is supported by an aligned pair of notches in the first interior wall and in the second interior wall.

25. The device of claim 1, wherein the tile further comprises:
- a floor; and
- a plurality of grooves in the floor, the grooves having a substantially arcuate cross-section of a width slightly larger than the thickness of the substantially planar media such that an edge of the substantially planar media is supported in one of the grooves.

26. The device of claim 25, wherein the grooves are comprised of two joined troughs, each trough having a substantially arcuate cross-section.

27. The device of claim 26, wherein the grooves have interior walls with nipples thereon to support the edge of the substantially planar media.

28. A device for storing substantially planar media, the device comprising:
- a base having a containing area, a first sidewall, and a second sidewall;
- a first set of pegs at a first height including a first group of pegs extending from the first sidewall and a second group of pegs extending from the second sidewall and being substantially aligned with the first group of pegs of the first set, the pegs of the first set of pegs being spaced relative to one another a distance which is slightly greater than the thickness of the substantially planar media such that an end of the substantially planar media may be extended between adjacent pegs of the first group and of the second group of the first set of pegs;
- a second set of pegs at a second height lower than the first height including a first group of pegs extending from the first sidewall and a second group of pegs extending from the second sidewall and being substantially aligned with the first group of pegs of the second set, the second set of pegs being staggered with respect to the first set of pegs such that aligned pairs of pegs of the first group and second group of the second set of pegs support an end of the substantially planar media; and
- a tile designed to be received within the containing area of the base and having:
  - a first set of partitions adjacent said first sidewall; and
  - a second set of partitions adjacent said second sidewall and aligned with said first set of partitions, each partition of the first set and of the second set being spaced from adjacent partitions a distance which is slightly greater than the thickness of the substantially planar media such that an end of the substantially planar media is supported by aligned pairs of partitions of the first set and second set.

29. The device of claim 28, wherein the first set of partitions and the second set of partitions have flared ends which support the end of the substantially planar media.

30. The device of claim 29, wherein the tile further comprises:
- a third set of partitions interior of the first set of partitions; and
- a fourth set of partitions interior of the second set of partitions and aligned with the third set of partitions, each partition of the third set and of the fourth set being spaced from adjacent partitions a distance which is slightly greater than the thickness of the substantially planar media such that an end of the substantially planar media is supported by aligned pairs of partitions of the third set and fourth set.

31. The device of claim 30, wherein the tile farther comprises:
- a first interior wall adjacent to and substantially orthogonal to the third set of partitions, the first interior wall having a notch between each adjacent pair of partitions of the third set of partitions; and
- a second interior wall adjacent to and substantially orthogonal to the fourth set of partitions, the second interior wall having a notch between each adjacent pair of partitions of the third set of partitions, the notches in the first interior wall and in the second interior wall having a width slightly greater than the thickness of the substantially planar media such that an end of the substantially planar media is supported by an aligned pair of notches in the first interior wall and in the second interior wall.

32. The device of claim 28, wherein the tile further comprises:
- a floor; and
- a plurality of grooves in the floor, the grooves having a substantially arcuate cross-section of a width slightly larger than the thickness of the substantially planar media such that an edge of the substantially planar media is supported in one of the grooves.

33. The device of claim 32, wherein the grooves are comprised of two joined troughs, each trough having a substantially arcuate cross-section.

34. The device of claim 33, wherein the grooves have interior walls with nipples thereon to support the edge of the substantially planar media.

35. The device for storing substantially planar media, at least one of which has rounded edges comprising:
- a tile having a floor, a first sidewall opposite a second sidewall, a first set of partitions adjacent said first sidewall;
- a second set of partitions adjacent said second sidewall and aligned with said first set of partitions, each partition of the first set and of the second set being spaced from adjacent partitions a distance which is slightly greater than the thickness of the substantially planar media such that an end of the substantially planar media is supported by aligned pairs of partitions of the first set and second set; and
- a plurality of grooves in the floor of the tile, the grooves having a substantially arcuate cross-section that substantially matches the rounded edges of the substantially planar media and being of a width slightly larger than the thickness of the substantially planar media such that the rounded edge of the substantially planar media is supported in one of the grooves.

36. The device of claim 35, wherein the first set of partitions and the second set of partitions have flared ends which support the end of the substantially planar media.

37. The device of claim 35, wherein the tile further comprises:
- a third set of partitions interior of the first set of partitions; and
- a fourth set of partitions interior of the second set of partitions and aligned with the third set of partitions, each partition of the third set and of the fourth set being spaced from adjacent partitions a distance which is slightly greater than the thickness of the substantially planar media such that an end of the substantially planar media is supported by aligned pairs of partitions of the third set and fourth set.

38. The device of claim 37, wherein the tile further comprises:
- a first interior wall adjacent to and substantially orthogonal to the third set of partitions, the first interior wall having a notch between each adjacent pair of partitions of the third set of partitions; and
- a second interior wall adjacent to and substantially orthogonal to the fourth set of partitions, the second interior wall having a notch between each adjacent pair of partitions of the third set of partitions, the notches in the first interior wall and in the second interior wall having a width slightly greater than the thickness of the substantially planar media such that an end of the substantially planar media is supported by an aligned pair of notches in the first interior wall and in the second interior wall.

39. The device of claim 35, wherein the grooves are comprised of two joined troughs, each trough having a substantially arcuate cross-section that substantially matches the rounded edges of the substantially planar media.

40. The device of claim 39, wherein the grooves have interior walls with nipples thereon to support the edge of the substantially planar media.

41. A compact disk divider for attaching to a tray, the tray having a first side and a second side, and a first set of retaining members adjacent the first side, the compact disk divider comprising:
- a base defining a longitudinal plane therethrough;
- a first tab projecting from the bottom of the base for inserting between a pair of retaining members in a first set of retaining members on a first side of a tray;
- a holding mechanism for holding a compact disk, the holding mechanism being designed such that a surface of a compact disk held by the holding mechanism is substantially parallel to and on a first side of the longitudinal plane of the base; the compact disk divider being designed such that when the first tab is inserted between a pair of a first set of retaining members on a first side of a tray, the compact disk divider is supported substantially erect for display, and
- a set of tabs on the base for receiving a substantially planar media having a substantially rectangular shape, the tabs being located on the side of the longitudinal plane of the base opposite of the first side.

42. The compact disk divider of claim 41, further comprising ribs on the bottom edge of the tab, the ribs for inserting between a pair of U-shaped retaining members on a tray.

43. The compact disk divider of claim 41, further comprising a second tab projecting from the bottom of the base, the second tab being spaced from the first tab, and the second tab for inserting between a pair of retaining members in a second set of retaining members adjacent to a second side of a tray.

44. The compact disk divider of claim 43, further comprising ribs on the bottom edge of the first and second tabs, the ribs for inserting into first and second pairs of U-shaped retaining members on a tray.

45. The compact disk divider of claim 41, wherein the holding mechanism comprises an arcuate rim having an arc corresponding to the curvature formed by an outer circumference of a standard compact disk, the arcuate rim configured to receive the bottom edge of a compact disk.

46. The compact disk divider of claim 45, further comprising tabs located on opposite sides of the arcuate rim, the tabs configured to retain a compact disk placed on the arcuate rim.

47. The compact disk divider of claim 46, further comprising first and second knobs, the first and second knobs resiliently biased toward one another and arranged such that the knobs resiliently bear against an edge of a compact disk received on the arcuate rim.

48. The compact disk divider of claim 46, further comprising an arcuate cutout extending a spaced distance above and along the arcuate rim and configured so as to facilitate grasping of a compact disk located on the arcuate rim.

* * * * *